United States Patent
Yamasaki (10) Patent No.: US 7,607,504 B2
(45) Date of Patent: Oct. 27, 2009

(54) MOTORCYCLE

(75) Inventor: Shigeto Yamasaki, Shizuoka (JP)

(73) Assignee: Yamaha Hatsudoki Kabushiki Kaisha, Shizuoka-Ken (JP)

(*) Notice: Subject to any disclaimer, the term of this patent is extended or adjusted under 35 U.S.C. 154(b) by 139 days.

(21) Appl. No.: 11/767,304

(22) Filed: Jun. 22, 2007

(65) Prior Publication Data

US 2008/0007042 A1  Jan. 10, 2008

(30) Foreign Application Priority Data

Jun. 23, 2006 (JP) ............................ 2006-174070
May 25, 2007 (JP) ............................ 2007-139748

(51) Int. Cl.
*B62K 11/02* (2006.01)
(52) U.S. Cl. .................... 180/219; 280/293; 280/274; 280/281.1
(58) Field of Classification Search ............... 180/218, 180/219; 280/835, 293, 301, 274, 281.1; 362/473
See application file for complete search history.

(56) References Cited

U.S. PATENT DOCUMENTS

| | | | | |
|---|---|---|---|---|
| 4,660,854 A * | 4/1987 | Suzuki et al. | ............... | 280/782 |
| 4,883,284 A * | 11/1989 | Nakazawa et al. | .......... | 280/293 |
| 5,599,085 A * | 2/1997 | Tabata et al. | ................. | 362/475 |
| 6,679,347 B2 * | 1/2004 | Iimuro | ....................... | 180/219 |
| 6,793,384 B2 * | 9/2004 | Ban et al. | ..................... | 362/473 |
| 7,360,619 B2 * | 4/2008 | Adachi et al. | ............... | 180/219 |
| 2008/0285292 A1 * | 11/2008 | Medina | ....................... | 362/473 |

FOREIGN PATENT DOCUMENTS

JP   2004-090880   3/2004

* cited by examiner

*Primary Examiner*—Tony H. Winer
(74) *Attorney, Agent, or Firm*—Hogan & Hartson LLP

(57) ABSTRACT

A motorcycle that has improved maneuverability and stability at high speed while retaining the external features of an American cruiser motorcycle. A front upper surface of a seat is formed in generally a straight line $L_U$ and inclines upward as the front upper surface extends toward the front. A fuel tank is formed such that the straight line $L_U$ generally extends to the front along a top surface of the fuel tank. A bottom end section is formed to incline upward as it extends toward the rear.

12 Claims, 9 Drawing Sheets

MOTORCYCLE

RELATED APPLICATIONS

This application claims the benefit of priority under 35 USC 119 of Japanese patent application no. 2006-174070, filed on Jun. 23, 2006, and Japanese patent application no. 2007-139748, filed on May 25, 2007, which applications are hereby incorporated by reference in their entireties.

BACKGROUND OF THE INVENTION

1. Field of the Invention

The present invention relates to a motorcycle, and more particularly relates to an American cruiser motorcycle having a riding position in which a rider sits with both legs extended forward.

2. Description of Related Art

Various types of motorcycles are available in the market that have different features depending on use conditions, user preferences, etc. Amongst these motorcycles, "American cruiser" motorcycles are widely available (for example, refer to JP-A-2004-90880 (Page 4, FIG. 1)).

Normally an American cruiser motorcycle has an external appearance wherein a front fork is steeply inclined to the rear, and the vehicle height and the seat height is low. As a result, the American cruiser motorcycle has a riding position where the rider hardly leans his/her upper body forward at all, while extending both his/her legs forward.

In contrast to other types of motorcycles, the design of an American cruiser motorcycle has emphasized steerability and comfort at low speeds. In recent years, there has been increased demand for improved maneuverability and stability of American cruiser motorcycles at high speeds. However, because of the external appearance of the American cruiser motorcycle, it is difficult to improve maneuverability and ensure stability at high speeds.

SUMMARY OF THE INVENTION

The invention has been devised in light of these circumstances and provides a motorcycle having the external features of an American cruiser motorcycle with improved maneuverability and ensured stability at high speeds.

A motorcycle according to one embodiment of the invention includes a head pipe and a down tube that extends downward and rearward from the head pipe. A bottom frame extends rearward from the down tube. An engine is disposed rearward from the down tube and above the bottom frame. A fuel tank is disposed above the engine. The motorcycle also has a seat disposed rearward from the fuel tank and a rear wheel. When viewed from the side, a front upper surface of the seat is formed generally as a straight line $L_U$ that inclines upward as the front upper surface extends toward the front. The fuel tank is formed such that the straight line $L_U$ generally extends to the front along a top surface of the fuel tank. A rear section of the bottom frame is formed to incline upward as it extends toward the rear.

According to the motorcycle with this structure, the fuel tank is disposed at a high position as compared to other members of the motorcycle, making it possible to raise the minimum road clearance of the engine that is disposed beneath the fuel tank, and more specifically an oil pan attached to a lower section of the engine. Raising the minimum road clearance allows the motorcycle to bank at a large bank angle, thereby improving maneuverability.

In addition, because the rear section of the bottom frame inclines upward as it extends toward the rear, it is possible to dispose more devices like the engine in a relatively wide front region. If more devices like the engine are disposed in the front region, weight distribution on the front wheel of the motorcycle is improved.

In a typical American cruiser motorcycle, the weight on the rear wheel is generally large relative to the weight on the front wheel. However, according to the invention, weight distribution on the front and rear wheels is optimized, thereby improving maneuverability and high speed stability of the motorcycle.

Furthermore, because the rear section inclines upward as it extends toward the rear, the frequency at which the bottom frame contacts the road surface when the motorcycle is banking is reduced, thereby ensuring that the motorcycle can bank at a large bank angle and improving maneuverability.

Moreover, because the front upper surface of the seat is formed generally as a straight line $L_U$ that inclines upward as the front upper surface extends toward the front, because straight line $L_U$ generally extends to the front along the top surface of the fuel tank, and because the rear section of the bottom frame inclines upward as it extends toward the rear, the motorcycle has a rear section that narrows when viewed from the side. Thus, the motorcycle has a wedge shape that reduces air resistance and ensures the stability of the motorcycle at high speed.

Accordingly, the motorcycle according to the invention provides improved maneuverability and stability at high speeds while retaining the external features of an American cruiser motorcycle, namely, low vehicle height and seat height.

In one embodiment of the invention, an extending straight line $L_{L2}$ that extends to the rear in line with the rear section of the bottom frame intersects at a rear section of the rear wheel with the extending straight line $L_U$.

In another embodiment, a rear fender covers above the rear wheel, and a height of a front end section of the seat from a road surface, and a height of an upper end section of the rear fender from the road surface, are generally the same.

In another embodiment, an endless transmission belt transmits driving force of the engine to the rear wheel. A lower end section of the belt that is located forward of the rear wheel is further from the road surface than the bottom frame.

Accordingly, the invention provides a motorcycle with improved maneuverability and stability at high speeds while retaining the external features of an American cruiser motorcycle.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Structure of a Motorcycle According to an Embodiment

An embodiment of the invention is now described with reference to the drawings. In the drawings, structural members that are the same or similar are denoted with the same or similar reference numerals. The figures are schematic, and the scale of dimensions and the like may thus be different relative to the actual object. Specific dimensions and the like can be determined with reference to the flowing description. In addition, the various figures include sections in which relationships and scales of respective dimensions, etc. are different.

Figure 1:
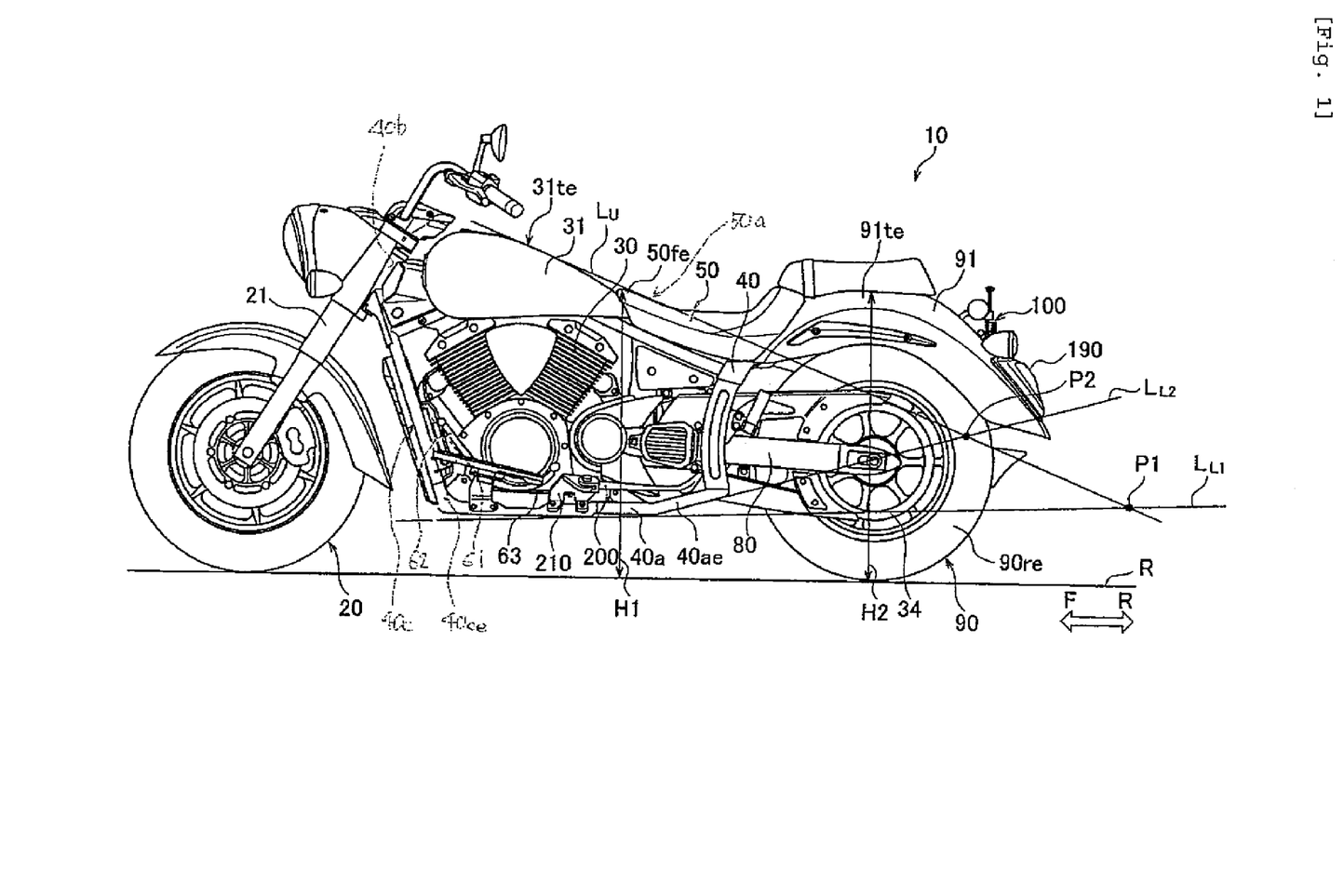
FIG. 1 is a left side view of a motorcycle according to an embodiment of the invention.

FIG. 1 is a left side view of a motorcycle 10 according to the embodiment. Motorcycle 10 is a so-called American cruiser motorcycle including a front wheel 20 and a rear wheel 90 that roll along a road surface R. A front fork 21 rotatably supports front wheel 20 and is steeply inclined to the rear (direction R in the figure). The vehicle height and seat height are low. As a result of this structure, in a riding position a rider hardly leans his/her upper body forward at all, while extending both legs forward.

An engine 30 generates driving force that is transmitted to rear wheel 90. Rear wheel 90 is rotatably supported by a rear arm 80 via a cogged belt 32 (FIG. 10) and rotated by the driving force generated by engine 30. An oil pan (not shown) is provided in a lower section of engine 30 to collect engine oil. A fuel tank 31 is disposed above engine 30 and stores fuel (gasoline) that is supplied to engine 30.

A body frame 40 forms the frame of motorcycle 10. Engine 30, fuel tank 31, seat 50 and the like, are attached to body frame 40. Body frame 40 includes a bottom frame 40a, a head pipe 40b and a down tube 40c. Bottom frame 40a extends toward the rear of the vehicle (in direction R) from a rear end 40ce of down tube 40c. Down tube 40c extends downwards and toward the rear of the vehicle from head pipe 40b. Engine 30 is rearward of down tube 40c and above bottom frame 40a.

Seat 50 is disposed next to and behind fuel tank 31. A rear fender 91 is disposed to the rear of seat 50. Rear fender 91 covers above rear wheel 90, and inhibits mud, water or the like adhered to rear wheel 90 from being flung outwards. Side bag stays (not shown) that support side bags disposed to the left and right sides of rear wheel 90 may be attached to rear fender 91.

Motorcycle 10 has various distinguishing features related to its side proportions. FIG. 1 depicts an extending straight line $L_U$ that extends to the front and rear in line with a front upper surface 50a of seat 50. Front upper surface 50a is formed in generally a straight line that inclines upward as front upper surface 50a extends toward the front (direction F). Thus, straight line $L_U$ inclines downward to the rear of motorcycle 10. Fuel tank 31 is formed such that straight line $L_U$ generally extends to the front along a top surface 31te of fuel tank 31.

A straight line $L_{L1}$ runs along bottom frame 40a. Straight line $L_{L1}$ inclines upward to the rear of motorcycle 10. Straight line $L_U$ and straight line $L_{L1}$ intersect at intersection point P1 toward the rear of motorcycle 10.

Bottom frame 40a is disposed in front of rear wheel 90 (direction F) and includes a bottom end section 40ae located to the rear wheel 90 side that inclines higher in the vertical direction as it extends toward the rear. An extending straight line $L_{L2}$ extends to the rear in line with bottom end section 40ae. Straight line $L_{L2}$ intersects with straight line $L_{L1}$ at a point P2 that is forward of point P1. More precisely, lines $L_U$ and $L_{L2}$ intersect at a rear section 90re of rear wheel 90.

A height H1 from road surface R to a front end section 50fe of seat 50 and a height H2 from road surface R to an upper end section 91te of rear fender 91 are roughly the same. Thus, the height of rear fender 91 from road surface R is lower than the height of top surface 31te of fuel tank 31 from road surface R.

Figure 10:
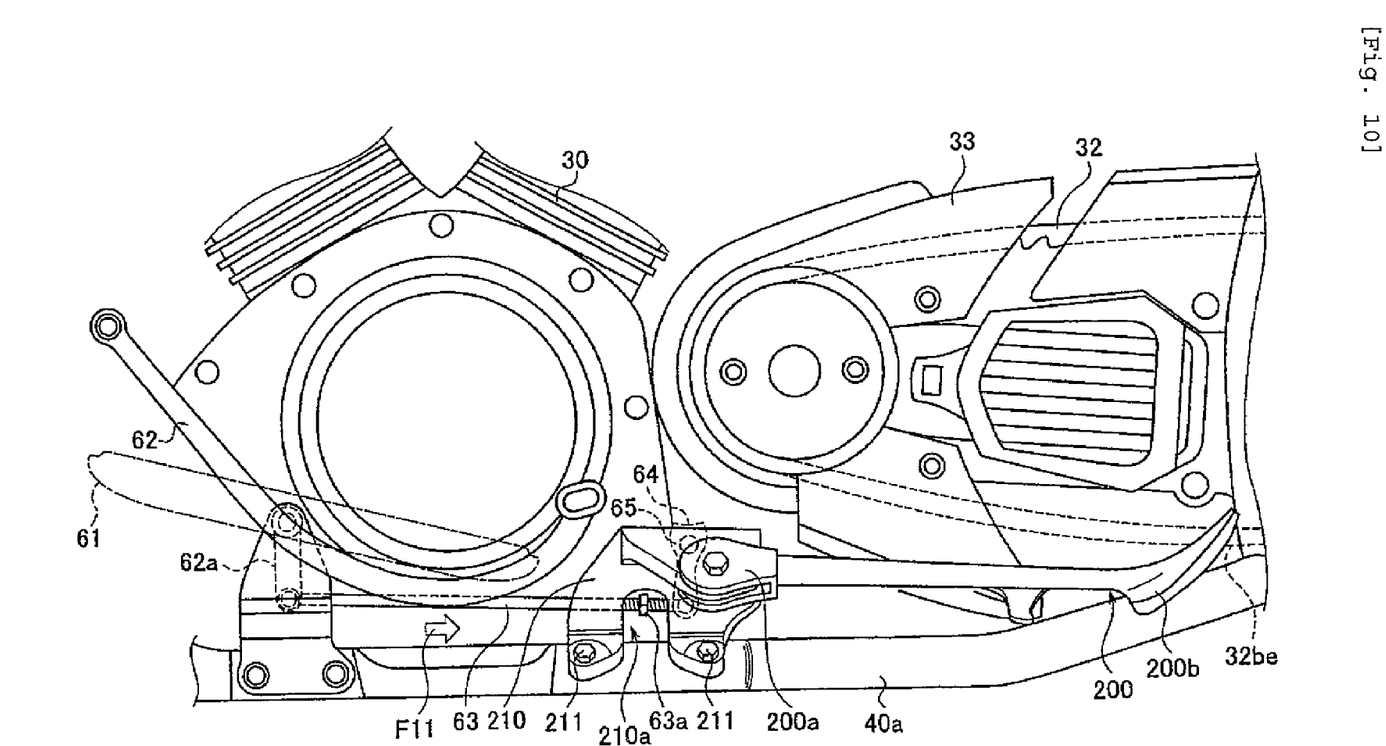
FIG. 10 is an expanded side view of a neighborhood around a bottom frame according to the embodiment of the invention.

FIG. 10 is an expanded side view of the vicinity of bottom frame 40a in which cogged belt 32 is wrapped around a drive pulley (not shown) and a driven pulley 34 (FIG. 1) disposed inside of a pulley cover 33. As can be seen in FIG. 10, a lower end section 32be of cogged belt 32, which is forward of rear wheel 90, is further away from road surface R than bottom frame 40a.

As can be seen from FIG. 1, a tail unit 100 and a tail lamp 190 are attached to rear fender 91. Tail unit 100 includes a license plate bracket 110 and flashers 120L, 120R (FIG. 2. The structure of tail unit 100 is described hereinafter.

A footboard 61 on which the rider places his/her left foot is attached to bottom frame 40a. A change pedal 62 is disposed at the inside in the vehicle width direction of footboard 61. Change pedal 62 switches gears (not shown) of a transmission, by turning a shift shaft 65 (FIGS. 10 and 11) connected to footboard 61 via a shift rod 63 or the like.

A stand bracket 210 is attached to bottom frame 40a and holds a side stand 200. Side stand 200 and it surrounding neighborhood are described hereinafter.

(Structure of the Tail Unit)

The structure of tail unit 100 is explained with reference to FIGS. 2-9, including (1) an overview of the structure of tail unit 100, (2) the attachment state of tail unit 100, and (3) the shape of flasher 120L.

(1) Overview of the Structure of Tail Unit 100

Tail unit 100 includes license plate bracket 110, flashers 120L, 120R, a bracket cover 130 (including a bracket 131), side reflectors 140L, 140R, a rear reflector 150, a license lamp 160 and a flasher stay 170.

Figure 3:
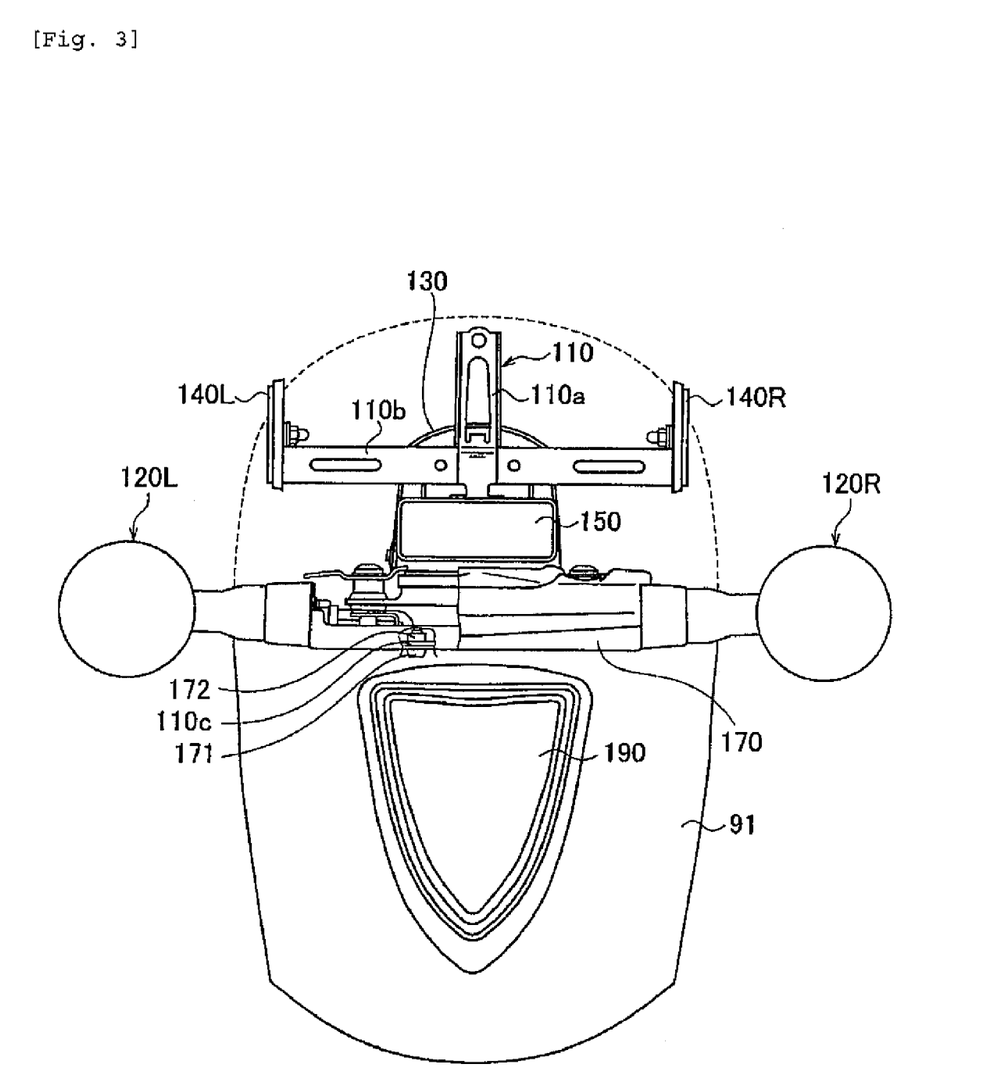
FIG. 3 is a front view of the tail unit and neighborhood around the tail unit.
Figure 5:
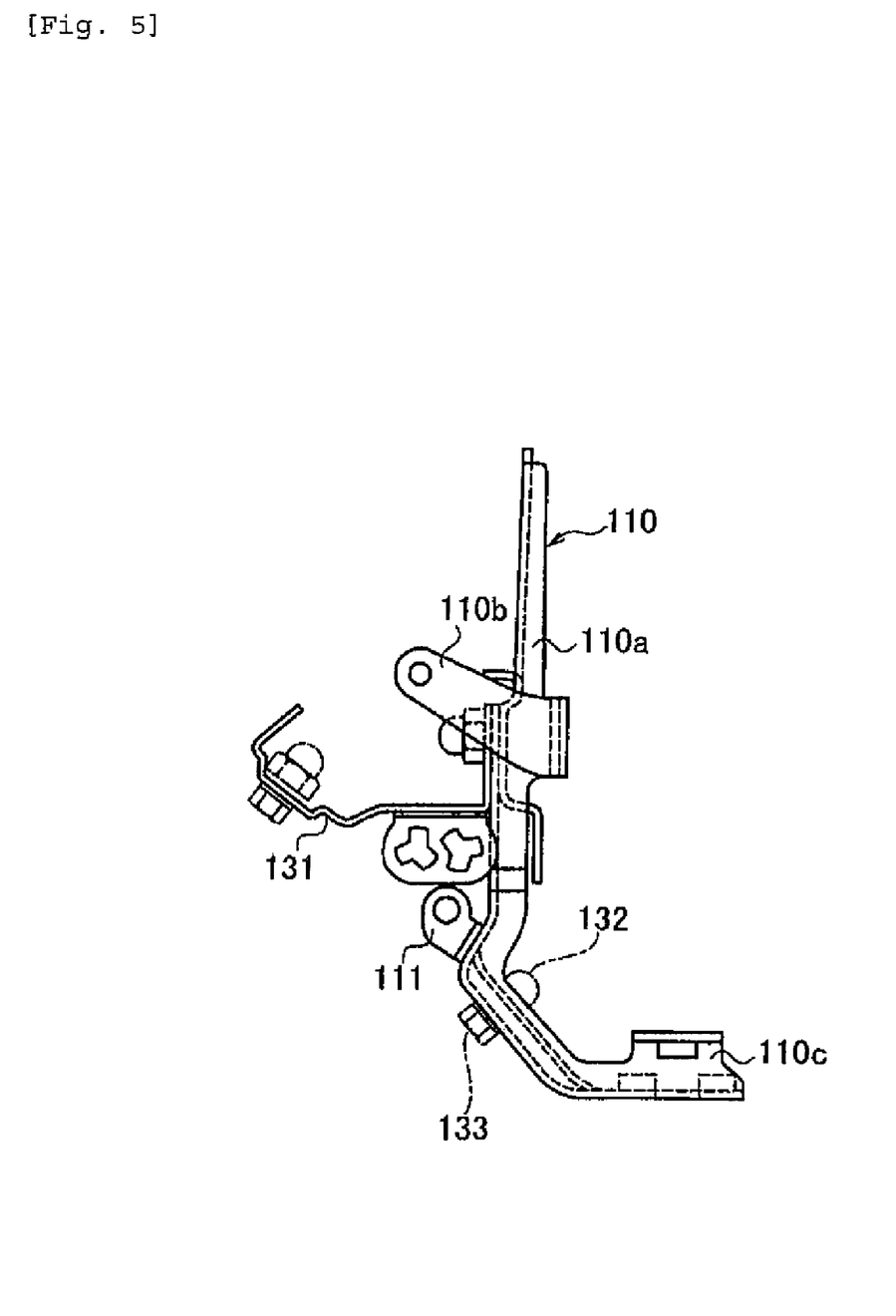
FIG. 5 is a side view of a license plate bracket unit that structures the tail unit according to the embodiment of the invention.

Referring to FIG. 5, license plate bracket 110 includes a post member 110a, an arm member 110b and a flasher stay attachment member 110c. A license plate is attached to post member 110a and arm member 110b. Both ends of arm member 110b are curved, and side reflectors 140L, 140R are attached to these curved ends (FIG. 3). Flasher stay 170 is attached to flasher stay attachment member 110c by a screw 171 and a nut 172 (FIG. 3).

Figure 2:
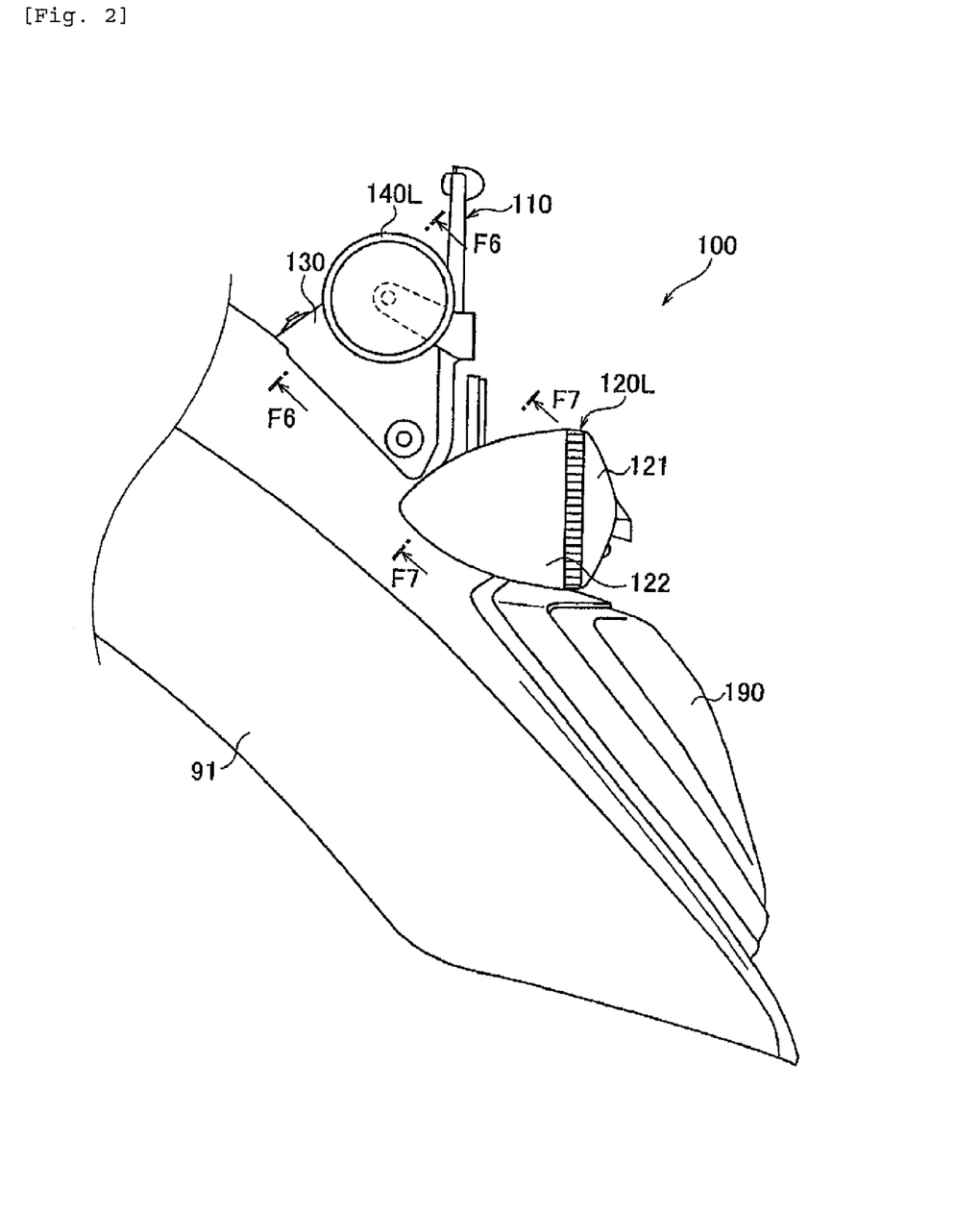
FIG. 2 is a side view of a tail unit and a neighborhood around the tail unit according to the embodiment of the invention.

Flashers 120L, 120R are attached to ends of flasher stay 170. Each flasher 120L, 120R includes a colorless (clear) flasher lens 121 and a bulb that is housed in a body 122 (FIG. 2). In one embodiment, the bulb is colored yellow so that flashers 120L, 120R emit yellow light at determined time intervals. The shape of flashers 120L (120R) is explained in more detail hereinafter.

Figure 4:
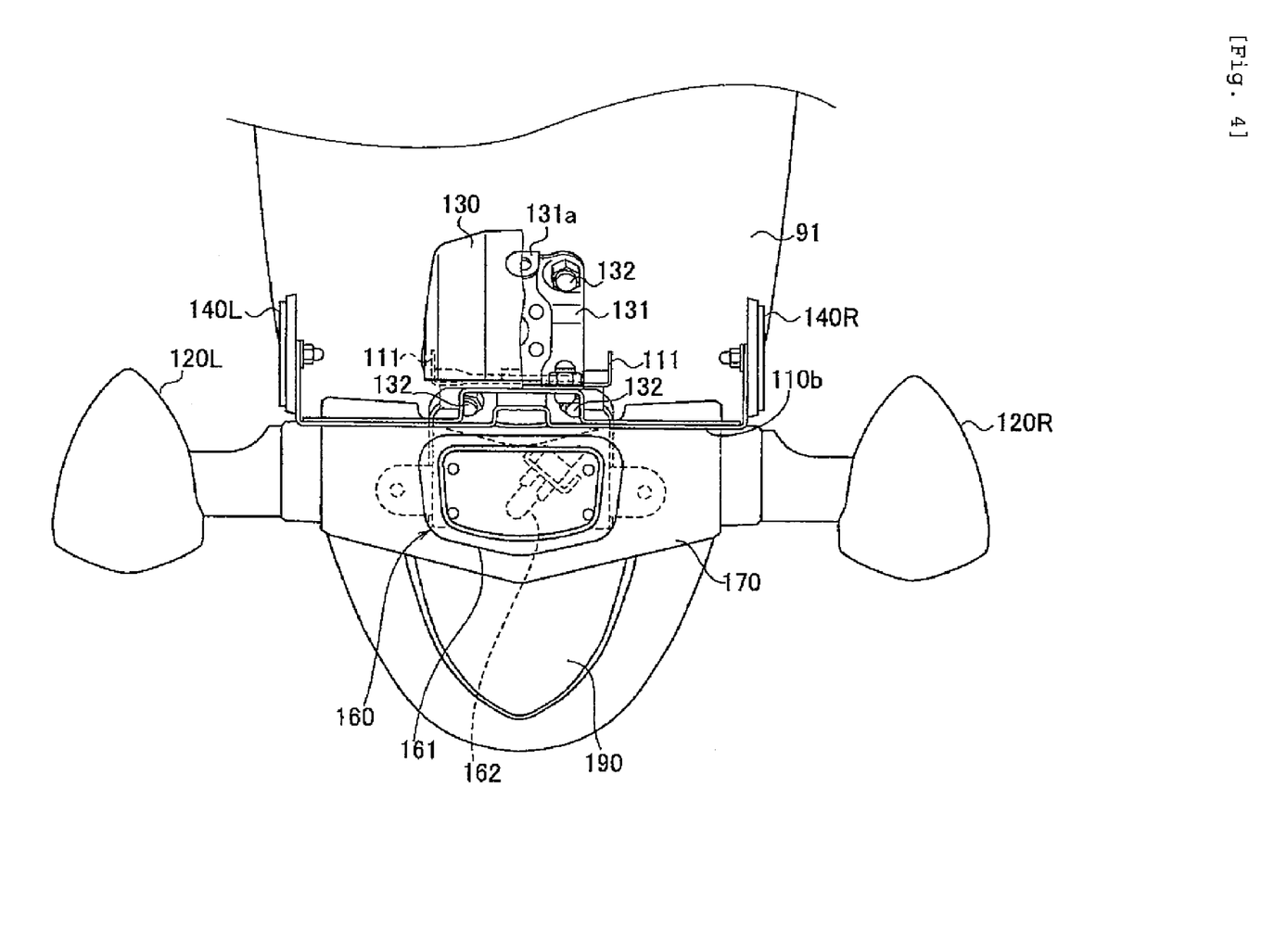
FIG. 4 is a plan view of the tail unit and neighborhood around the tail unit.

As can be seen in FIGS. 4 and 5, bracket 131 that is used to fix tail unit 100 to rear fender 91 is connected to license plate bracket 110. Bracket 131 is covered by bracket cover 130. Bracket cover 130 is fixed by an attachment member 111 that is formed in license plate bracket 110 and an attachment member 131a that is formed in bracket 131.

As shown in FIG. 3, rear reflector 150 is attached below arm member 110b. Moreover, as can be seen in FIG. 4, license lamp 160 is provided at an upper section of flasher stay 170. License lamp 160 has a clear lens 161 and a bulb 162 provided below clear lens 161.

(2) Attachment State of the Tail Unit 100

Figure 6:
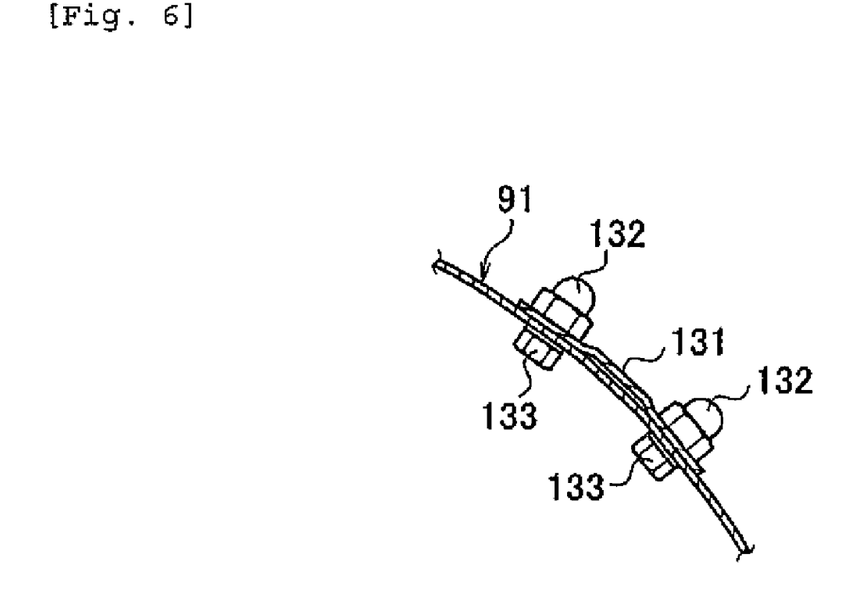
FIG. 6 is a cross sectional view along line F6-F6 of FIG. 2.

The attachment state of tail unit 100 is explained with reference to FIGS. 4-7. Referring to FIG. 6, bracket 131 connected to license plate bracket 110 is fixed to rear fender 91 by bolts 132 inserted thought bolt holes formed in rear fender 91 and bracket 131 and nuts 133 (also refer to FIG. 4).

Figure 7:
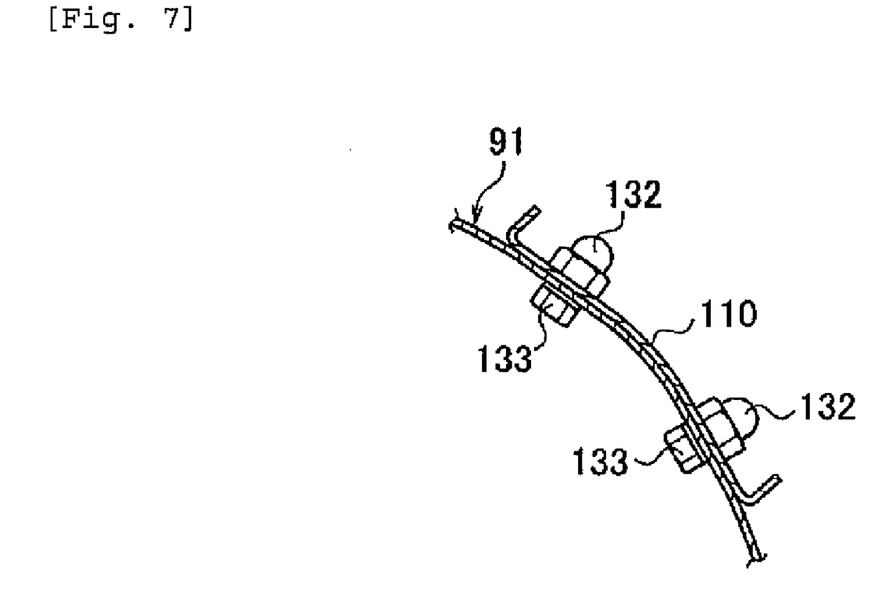
FIG. 7 is a cross sectional view along line F7-F7 of FIG. 2.

In addition, as can be seen from FIG. 7, license plate bracket 110 (post member 110a) is fixed to rear fender 91 by bolts 132 inserted through bolt holes formed in rear fender 91 and license plate bracket 110 and nuts 133 (refer to FIGS. 4 and 5).

(3) Shape of Flasher 120L

Figure 8:
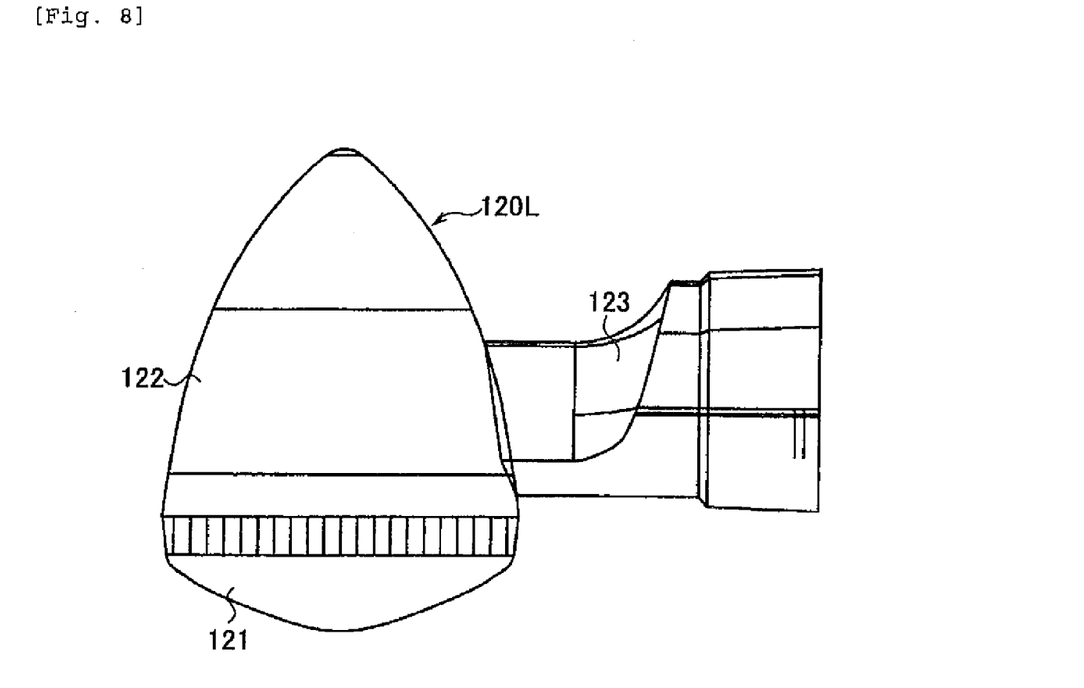
FIG. 8 is a plan view of a flasher according to the embodiment of the invention.
Figure 9:
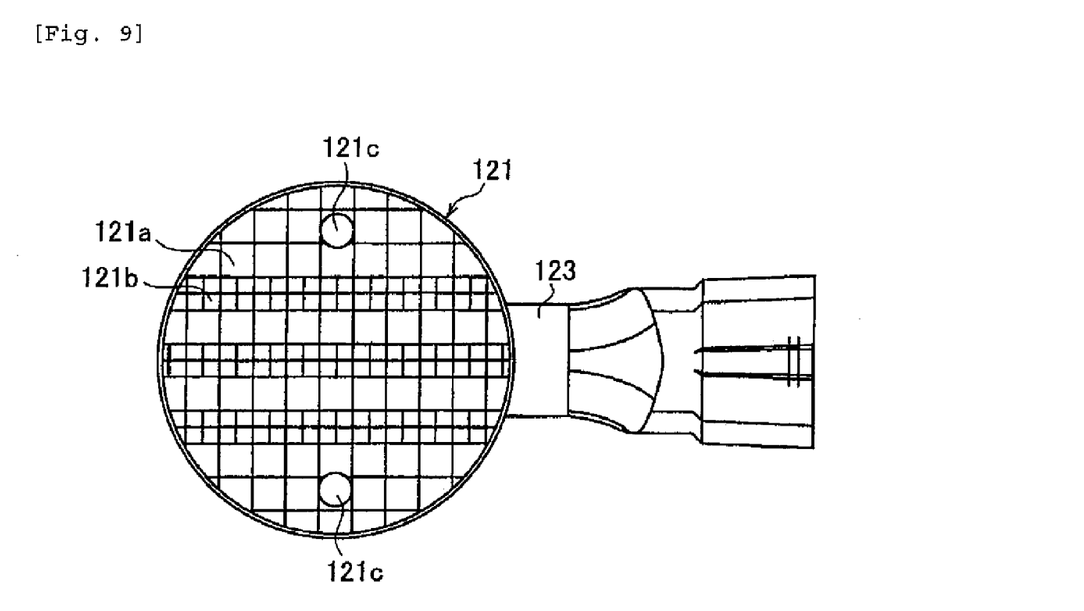
FIG. 9 is a front view of the flasher.

The shape of flasher 120L is explained with reference to FIGS. 8 and 9. Because flasher 120R has a shape that is symmetric to flasher 120L, an explanation thereof is omitted here.

Flasher 120L includes flasher lens 121, body 122, and an arm member 123. As described previously, a yellow bulb is housed inside body 122. Arm member 123 is connected to flasher stay 170. In addition, as shown in FIG. 9, flasher lens 121 has a generally circular shape when viewed from the front. Flasher lens 121 includes large cut sections 121a, small cut sections 121b and screw holes 121c.

The outer surfaces of large cut sections 121a and small cut sections 121b are recessed towards body 122. In this embodiment, small cut sections 121b are in rows extending in the vehicle width direction, and large cut sections 121a are in rows that are above and below small cut sections 121b and that extend in the vehicle width direction. Screw holes 121c are provided in an upper end section and a lower end section of flasher lens 121.

(Neighborhood of the Side Stand)

The neighborhood of side stand 200 is explained with reference to FIGS. 10 and 11. FIG. 10 shows a state when side stand 200 is folded in, and FIG. 11 shows a state when side stand 200 is extended.

Side stand 200 includes a head member 200a and a foot member 200b. Head member 200a is turnably supported by stand bracket 210. Stand bracket 210 is fixed at two points to bottom frame 40a using bolts 211. A notch 210a is formed in stand bracket 210.

Foot board 61 is attached to bottom frame 40a. Change pedal 62 is disposed at the inside of foot board 61 in the vehicle width direction, and switches gears of the transmission by turning shift shaft 65. More specifically, a pedal arm 62a is formed in change pedal 62. Shift rod 63 is connected to pedal arm 62a. An adjustment nut 63a that adjusts the distance between pedal arm 62a and shift arm 64 is attached to shift rod 63.

Figure 11:
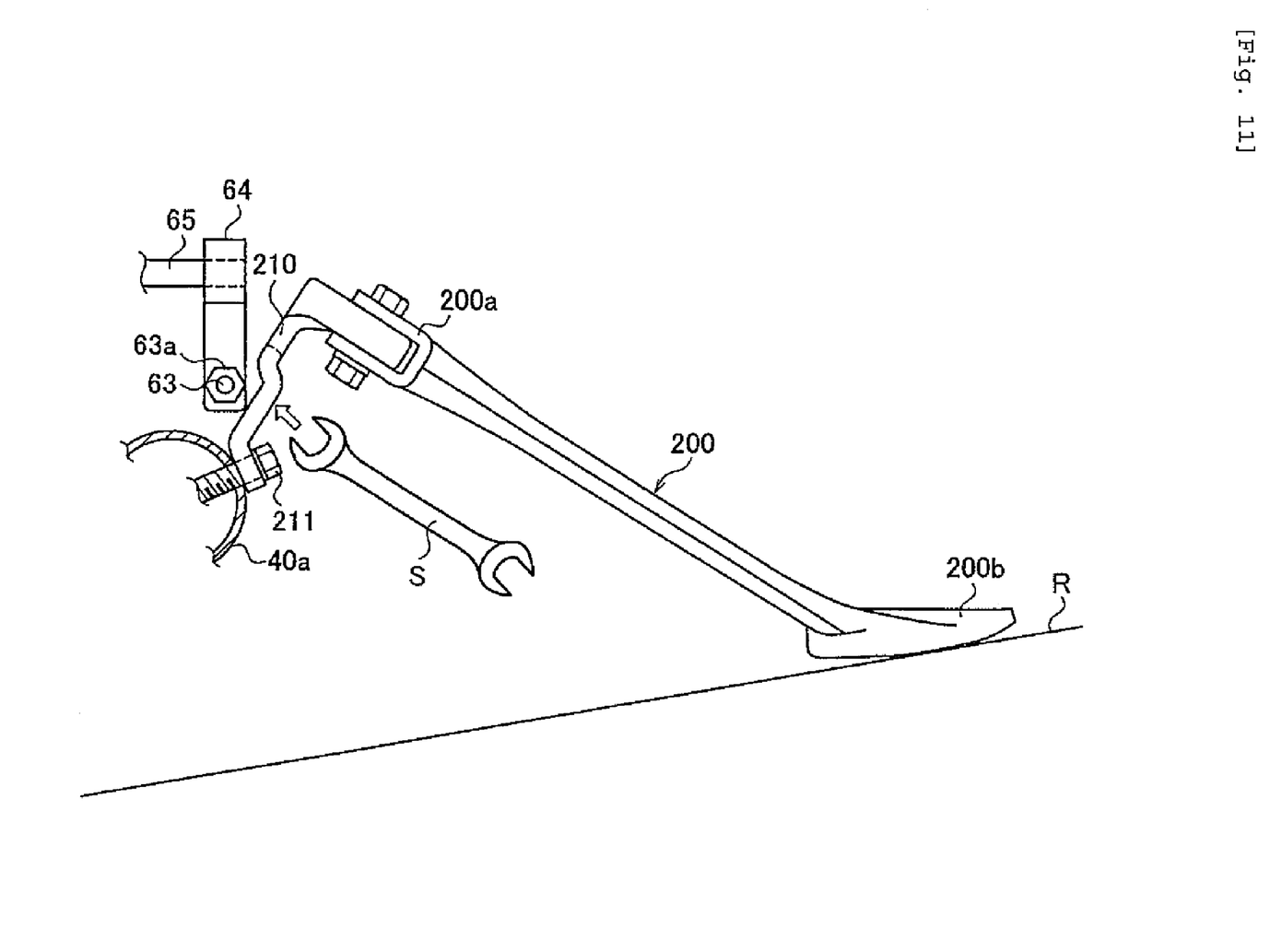
FIG. 11 is a view along the direction of arrow F11 of FIG. 10.

In FIG. 11, side stand 200 is extended, and foot member 200b is placed in contact with road surface R. As described previously, notch 210a (refer to FIG. 10) is formed in stand bracket 210. A spanner S can be inserted to the inside of stand bracket 210 through notch 210a (in the direction of the arrow shown in the figure). Accordingly, spanner S, which has been inserted through notch 210a to the inside of stand bracket 210, can be used to turn adjustment nut 63a.

(Operation & Effects)

According to motorcycle 10, front upper surface 50a of seat 50 is formed to be generally a straight line and inclines upward as front upper surface 50a extends toward the front. Meanwhile, bottom end section 40ae is formed such that bottom end section 40ae inclines upward as it extends toward the rear.

More specifically, front upper surface 50a of seat 50 is formed to be generally a straight line and inclines upward as front upper surface 50a extends toward the front, and fuel tank 31 is formed such that straight line $L_U$ generally extends to the front along top surface 31te of fuel tank 31. As a result, fuel tank 31 is disposed at a high position as compared to other members of motorcycle 10, which allows the minimum road clearance of engine 30 that is disposed beneath fuel tank 31 to be raised (more specifically, the oil pan attached to the lower section of engine 30). By raising the minimum road clearance of engine 30 and the oil pan, motorcycle 10 can bank at a large bank angle and thereby has improved maneuverability.

In addition, because bottom end section 40ae is formed such that bottom end section 40ae inclines upward as it extends toward the rear, more of the various types of devices like engine 30 mounted on motorcycle 10 can be disposed in a relatively wide front region. If more devices like engine 30 are disposed in the front region, the weight distribution on front wheel 20 of motorcycle 10 is improved.

In a typical American cruiser motorcycle, the weight on the rear wheel is generally large relative to the weight on the front wheel. However, according to motorcycle 10, the weight distribution on front wheel 20 and rear wheel 90 is optimized, thereby improving maneuverability and high speed stability of motorcycle 10.

Furthermore, because bottom end section 40ae is formed such that bottom end section 40ae inclines upward as it extends toward the rear, the frequency of contact with road surface R by bottom frame 40a when motorcycle 10 is banking is reduced. As a result, motorcycle 10 is capable of banking at a large bank angle, whereby maneuverability of motorcycle 10 is improved.

In addition, because front upper surface 50a of seat 50 is formed generally in a straight line that inclines upward as front upper surface 50a extends toward the front, because fuel tank 31 is formed such that straight line $L_U$ generally extends to the front along top surface 31te of fuel tank 31, and because bottom end section 40ae inclines upward as it extends toward the rear, motorcycle 10 has a rear section that narrows when viewed from the side. Thus, motorcycle 10 has a wedge shape that reduces air resistance and ensures the stability of motorcycle 10 at high speed.

Thus, according to the invention, high speed stability and improved maneuverability are provided while retaining the external features of an American cruiser motorcycle, namely, low vehicle and seat height.

Moreover, in this embodiment, straight line $L_{L2}$ intersects straight line $L_U$ at point P2, which is forward of the intersection of straight line $L_{L1}$ with straight line $L_U$ (point P1). Lines $L_U$ and $L_{L2}$ intersect at rear section 90re of rear wheel 90. As a result, when motorcycle 10 is banking, even if bottom end section 40ae lowers toward road surface R as a result of rear arm 80 vibrating substantially due to drive reaction force, the frequency at which bottom end section 40ae contacts road surface R is reduced.

In addition, in this embodiment, the height from road surface R to front end section 50fe of seat 50 and the height from road surface R to upper end section 91te of rear fender 91 are roughly the same. As a result, the height of rear fender 91 is comparatively low as compared to the height of other members.

As described above, side bag stays that support side bags provided on the left and right sides of rear wheel 90 can be attached to rear fender 91. If the height of rear fender 91 is comparatively low as compared to other members, the center of gravity of the side bags lowered. Thus, maneuverability of motorcycle 10 is improved even when the side bags are being used.

Moreover, in this embodiment, lower end section 32be of cogged belt 32, which is positioned forward of rear wheel 90, is further away from road surface R than bottom frame 40a. As a result, the frequency at which lower end section 32be of cogged belt 32 (more specifically, the belt cover covering cogged belt 32) contacts road surface R when motorcycle 10 is banking is reduced.

Furthermore, flashers 120L, 120R, side reflectors 140L, 140R, rear reflector 150, and license lamp 160 are assembled together and integrated in tail unit 100. As a result, tail unit 100 can be attached to rear fender 91 after tail unit 100 has been assembled (sub-assembled), thereby simplifying assembly, attachment and removal operations.

In addition, in this embodiment, small cut sections 121b of flasher lens 121 are in rows extending in the vehicle width direction, and large cut sections 121a are in rows that are above and below small cut sections 121b and that extend in the vehicle width direction. A sharp beam like a spot beam is irradiated by large cut sections 121a, while a beam that is more diffused than that emitted by large cut sections 121a is emitted from small cut sections 121b. As a result, light emitted by large cut sections 121a and small cut sections 121b forms an attractive ribbon pattern on the irradiated object of the light.

In motorcycle 10, because notch 210a is formed in stand bracket 210, spanner S can be inserted through notch 210a to the inside of stand bracket 210 and used to turn adjustment nut 63a. Generally, the attachment position of side stand 200 is determined while taking into consideration the position of the center of gravity of motorcycle 10, and thus the range of possible attachment positions is extremely limited. Furthermore, the position of shift shaft 65 cannot be easily changed. According to motorcycle 10, even if the positions of side stand 200 and adjustment nut 63a overlap, adjustment nut 63a is easily accessed without changing the positions of side stand 200 and shift shaft 65.

Other Embodiments

An embodiment of the invention has been described to disclose the features of the invention. However, the invention is not limited by this description and drawings. From the disclosure, various modified forms of the invention will be apparent to those skilled in the art.

For example, in flasher lens 121, the ratio and arrangement of large cut sections 121a and small cut sections 121b are not limited to those explained in the above-described embodiment. For example, large cut sections 121a and small cut sections 121b may be arranged in rows in the up-down direction of the vehicle, instead of being arranged in rows in the vehicle width direction.

In addition, it is not essential that the height from road surface R to front end section 50fe and the height from road surface R to upper end section 91te of rear fender 91 are substantially the same. Moreover, bottom end section 40ae need not necessarily extend along straight line $L_{L2}$. Further, bottom end section 40ae may have a curved shape instead of a straight line shape.

As will be readily apparent, the invention includes various modified embodiments not described here like those described above. Accordingly, the technical scope of the invention is defined by the specific features of the invention set forth in the claims that are reasonable given the above description.

The invention claimed is:

1. A motorcycle comprising:
   a headpipe;
   a steering post extending upward from the headpipe;
   a handlebar extending from the steering post;
   a down tube that extends downward and rearward from the head pipe;
   a bottom frame that extends rearward from the down tube;
   an engine disposed rearward from the down tube and above the bottom frame;
   a fuel tank disposed above the engine;
   a seat disposed rearward from the fuel tank; and
   a rear wheel,
   wherein when viewed from a side of the motorcycle,
   a front upper surface of the seat is formed generally as a straight line $L_U$ that inclines upward as the front upper surface extends toward a front of the motorcycle,
   the fuel tank is formed such that the straight line $L_U$ generally extends toward the front along a top surface of the fuel tank,
   the straight line $L_U$ extends above and axle of the rear wheel and below the handlebar, and
   a rear section of the bottom frame is formed to incline upward as the rear section of the bottom frame extends toward a rear of the motorcycle.

2. The motorcycle according to claim 1, wherein an extending straight line $L_{L2}$ that extends to the rear in line with the rear section of the bottom frame intersects with the extending straight line $L_U$ at a point P2 rearward of the axle of the rear wheel.

3. The motorcycle according to claim 2, wherein an extending straight line $L_{L1}$ that runs along a main section of the bottom frame intersects with extending straight line $L_U$ at a point P1 that is rearward of point P2.

4. The motorcycle according to claim 1, further comprising:
   a rear fender that covers above the rear wheel, wherein
   a height of a front end section of the seat from a road surface, and a height of an upper end section of the rear fender from the road surface are generally the same.

5. The motorcycle according to claim 1, further comprising:
   an endless transmission belt that transmits driving force of the engine to the rear wheel, wherein
   a lower end section of the endless transmission belt that is located to the front of the rear wheel is further away from the road surface than the bottom frame.

6. The motorcycle according to claim 4, further comprising:
   a sub-assembled and integrated tail unit comprising flashers, side reflectors, a rear reflector and a license lamp, the tail unit being attached to the rear fender.

7. The motorcycle according to claim 6, wherein each flasher comprises:
   a lens having small cut sections in rows extending in a vehicle width direction and large cut sections in rows that are above and below the small cut sections.

8. A motorcycle comprising:

a headpipe;

a down tube that extends downward and rearward from the head pipe;

a bottom frame that extends rearward from the down tube;

an engine disposed rearward from the down tube and above the bottom frame;

a fuel tank disposed above the engine;

a seat disposed rearward from the fuel tank;

a rear wheel a side stand; and a stand bracket that turnably supports the side stand and attaches the side stand to the bottom frame, wherein a notch is formed in the stand bracket to permit tool access, and wherein when viewed from a side of the motorcycle, a front upper surface of the seat is formed generally as a straight line $L_U$ that inclines upward as the front upper surface extends toward a front of the motorcycle, the fuel tank is formed such that the straight line $L_U$ generally extends toward the front along a top surface of the fuel tank, and a rear section of the bottom frame is formed to incline upward as the rear section of the bottom frame extends toward a rear of the motorcycle.

9. The motorcycle according to claim 8, wherein the notch permits access by a spanner tool to an adjustment nut for adjusting a distance between a shift change pedal and a shift shaft.

10. A motorcycle comprising:

a bottom frame;

a rear wheel;

a fuel tank disposed above the bottom frame; and a seat disposed rearward from the fuel tank, wherein a straight line $L_U$ extends along a front upper surface of the seat and inclines upward as the front upper surface of the seat extends toward the fuel tank, wherein a straight line $L_{L1}$ extends along a front section of the bottom frame, wherein a straight line $L_{L2}$ extends along a rear section of the bottom frame and inclines upward as the rear section of the bottom frame extends towards the rear, wherein the lines $L_U$ and $L_{L1}$ intersect at a point P1, and the lines $L_U$ and $L_{L2}$ intersect at a point P2, and wherein the point P2 is forward of the point P1 and rearward of an axle of the rear wheel.

11. The motorcycle according to claim 10, and further comprising:

a rear fender, wherein a front end section of the seat is positioned at approximately a same height as an upper end section of the rear fender.

12. The motorcycle according to claim 10, and further comprising:

a transmission belt, wherein a lower end of the transmission belt is higher than the bottom frame.

* * * * *